(No Model.)

C. A. COOPER.
SAFETY FASTENING FOR LACE PINS, &c.

No. 353,052. Patented Nov. 23, 1886.

WITNESSES:
Chas. Niaa
C. Sedgwick

INVENTOR:
C. A. Cooper
BY Munn & Co
ATTORNEYS.

UNITED STATES PATENT OFFICE.

CHARLES ALBERT COOPER, OF NEW YORK, N. Y.

SAFETY-FASTENING FOR LACE-PINS, &c.

SPECIFICATION forming part of Letters Patent No. 353,052, dated November 23, 1886.

Application filed April 23, 1886. Serial No. 199,934. (No model.)

*To all whom it may concern:*

Be it known that I, CHARLES ALBERT COOPER, of the city, county, and State of New York, have invented a new and useful Improvement in Safety-Fastenings for Lace-Pins, Brooches, and Hair-Ornaments, of which the following is a full, clear, and exact description.

Reference is to be had to the accompanying drawings, forming a part of this specification, in which similar letters of reference indicate corresponding parts in all the figures.

Figure 1:
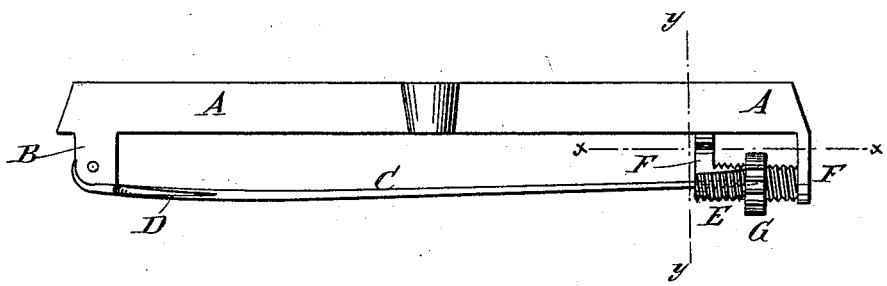
Figure 2:
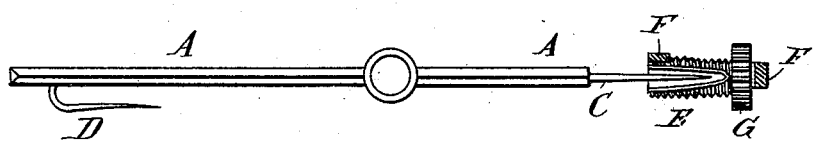
Figure 3:
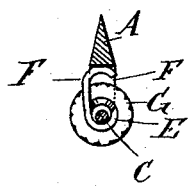

Figure 1 is a side elevation of a lace-pin to which my improvement has been applied. Fig. 2 is a front elevation of the same, partly in section, through the line $x\,x$, Fig. 1. Fig. 3 is a sectional end elevation of the same, taken through the line $y\,y$, Fig. 1.

The object of this invention is to provide improved safety-fastenings for lace-pins, brooches, and hair-ornaments, constructed in such a manner that they will not be liable to become accidentally unfastened, and which shall be simple in construction and convenient in use.

The invention consists in the combination, with the body of a lace-pin, brooch, or hair-ornament and its pin, of a socket connected with the said body, open upon the upper side and having an exterior screw-thread, and the nut placed upon the said socket, whereby the point of the said pin can be readily secured in the said socket, as will be hereinafter fully described.

A represents the body of a lace-pin, which may be made of any desired shape or style. To a lug, B, at one end of the body A, is hinged the pin C, in the ordinary manner, and which may be provided, if desired, with a branch side pin, D. When the article is in use, the point of the pin C rests in a socket, E, secured at one or both ends to lugs or studs F, formed upon or secured to the body A, the inner lug, F, being so formed as to leave the upper side of the inner end of the said socket E uncovered. The inner part of the socket E is open upon the upper side, so that the point of the pin C can be readily sprung into and out of the said socket.

Upon the socket E is formed an exterior screw-thread, to receive the nut G, so that the said nut G can be turned forward upon the said socket to cover the end of the pin C, and thus prevent it from becoming accidentally unfastened. When the pin is to be detached, the nut G is turned back toward the outer end of the socket E, to uncover the end of the pin C and allow it to be raised out of the said socket.

The outer edge of the nut G can be milled, to allow it to be more readily turned.

Having thus fully described my invention, what I claim as new, and desire to secure by Letters Patent, is—

In lace-pins, brooches, and hair-ornaments, the combination, with the body A and pin C, of an externally-threaded socket, E, rigidly connected to the body by the projecting lug or lugs F, and slotted upon its inner side, and the internally-threaded nut G, adapted to be screwed along the threaded socket E, and playing between the body A and the socket, substantially as herein shown and described.

CHARLES ALBERT COOPER.

Witnesses:
BERNARD J. KELLY,
CHARLES W. KELLY.